Figure 1:
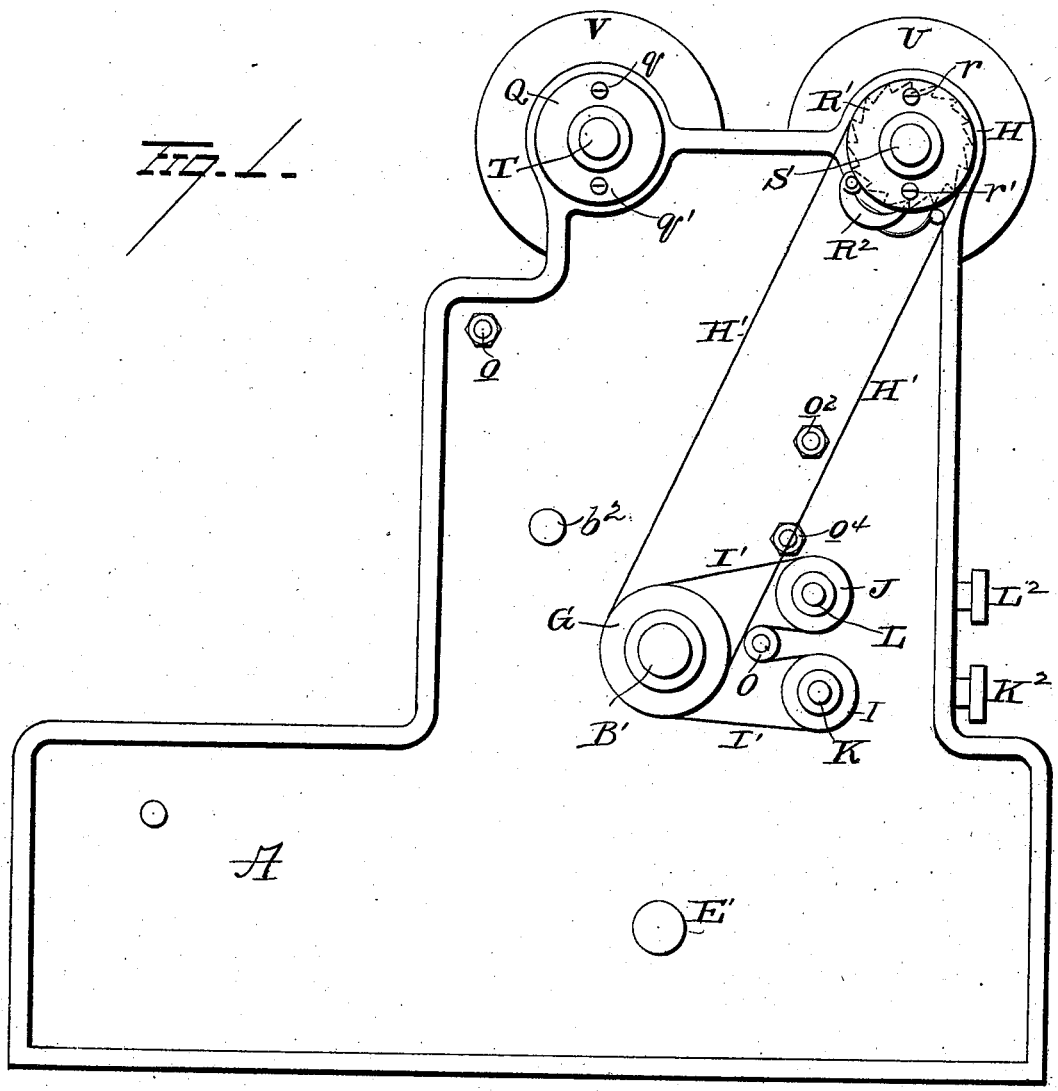

No. 698,034. Patented Apr. 22, 1902.
C. E. MAAS.
MACHINE FOR EMBOSSING AND PRINTING.
(Application filed Dec. 10, 1897.)
(No Model.) 6 Sheets—Sheet 1.

WITNESSES
E. J. Nottingham
G. F. Downing

INVENTOR
C. E. Maas
By H. A. Seymour
Attorney

No. 698,034. Patented Apr. 22, 1902.
C. E. MAAS.
MACHINE FOR EMBOSSING AND PRINTING.
(Application filed Dec. 10, 1897.)
(No Model.) 6 Sheets—Sheet 2.

WITNESSES
INVENTOR
Attorney

No. 698,034. Patented Apr. 22, 1902.
C. E. MAAS.
MACHINE FOR EMBOSSING AND PRINTING.
(Application filed Dec. 10, 1897.)
(No Model.) 6 Sheets—Sheet 3.

WITNESSES
E. J. Nottingham
G. F. Downing

INVENTOR
C. E. Maas
By H. A. Seymour
Attorney

No. 698,034. Patented Apr. 22, 1902.
C. E. MAAS.
MACHINE FOR EMBOSSING AND PRINTING.
(Application filed Dec. 10, 1897.)
(No Model.) 6 Sheets—Sheet 5.
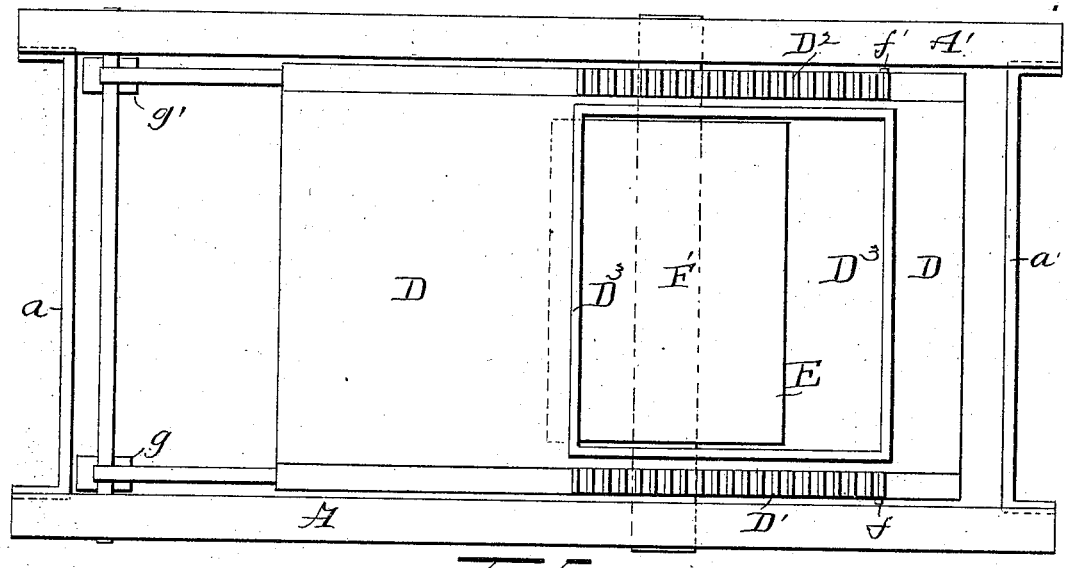
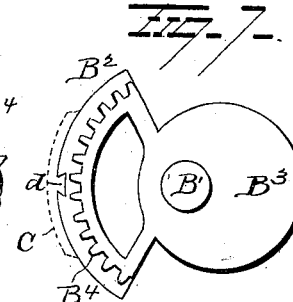 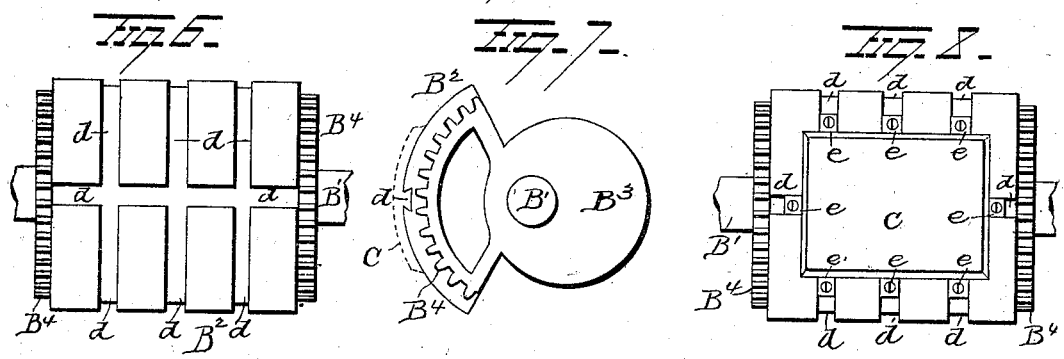 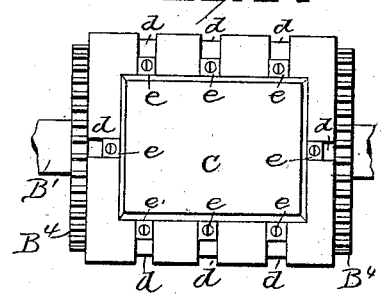
 
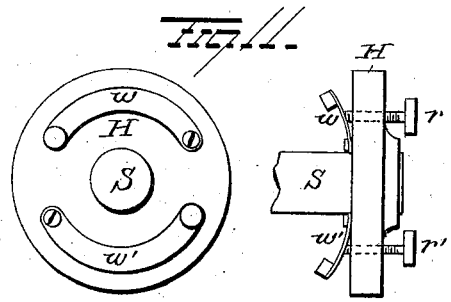
WITNESSES
E. J. Nottingham
G. F. Downing
INVENTOR
C. E. Maas
By H. A. Seymour
Attorney
THE NORRIS PETERS CO., PHOTO-LITHO., WASHINGTON, D. C.

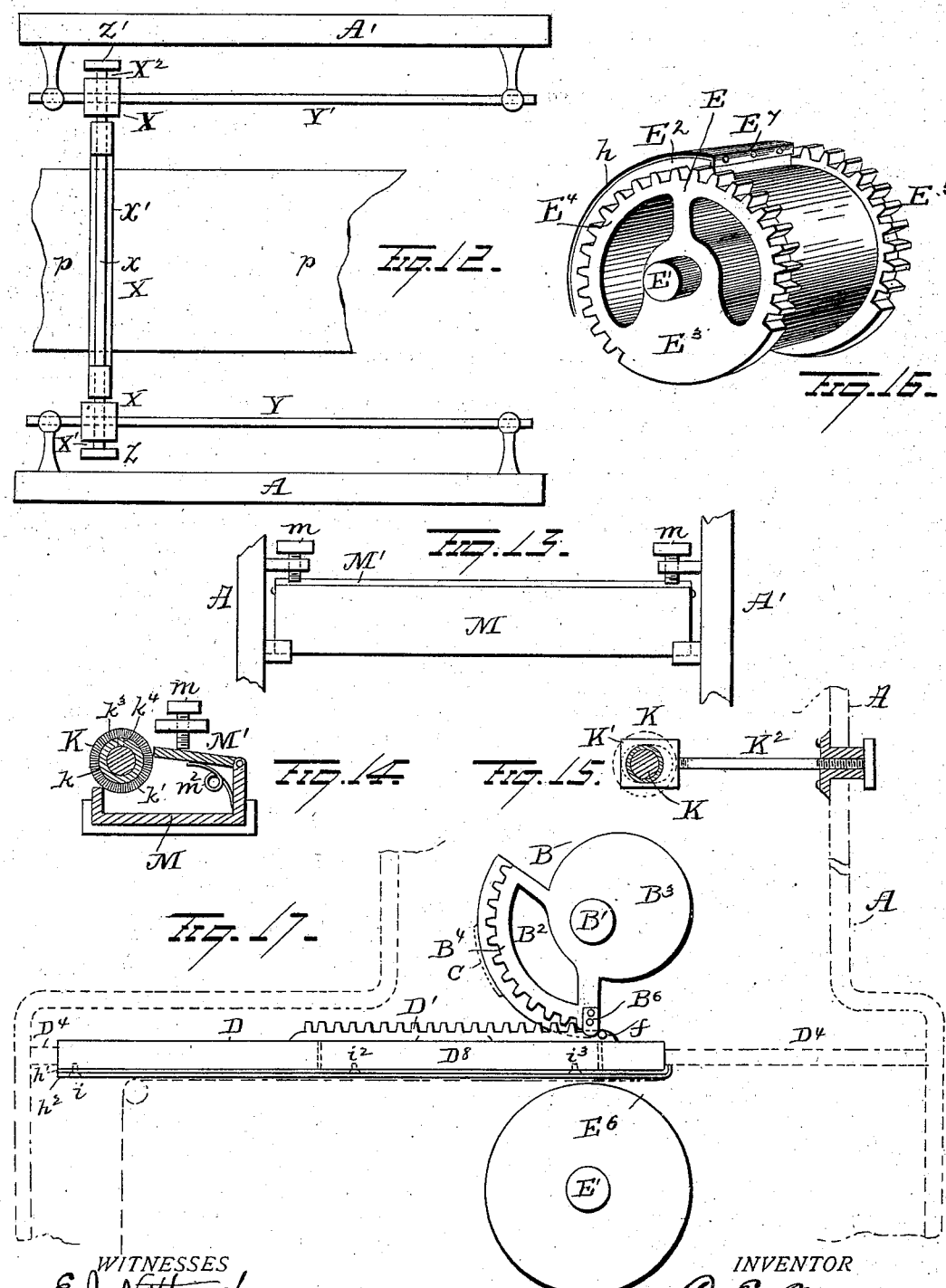

UNITED STATES PATENT OFFICE.

CHARLES E. MAAS, OF RIDLEY PARK, PENNSYLVANIA, ASSIGNOR OF ONE-HALF TO F. B. GREENE, OF GERMANTOWN, PENNSYLVANIA.

MACHINE FOR EMBOSSING AND PRINTING.

SPECIFICATION forming part of Letters Patent No. 698,034, dated April 22, 1902.

Application filed December 10, 1897. Serial No. 661,352. (No model.)

*To all whom it may concern:*

Be it known that I, CHARLES E. MAAS, a resident of Ridley Park, in the county of Delaware and State of Pennsylvania, have invented certain new and useful Improvements in Machines for Embossing and Printing; and I do hereby declare the following to be a full, clear, and exact description of the invention, such as will enable others skilled in the art to which it appertains to make and use the same.

My invention relates to an improvement in machines for embossing and printing.

By the machines now in general use embossing and printing on paper or other material are generally accomplished substantially by some one of the following methods: By one method the design is first printed on any suitable press and is afterward embossed as a secondary and subsequent process. The embossing may be accomplished by a platen-press with direct flat pressure. It may be done by a cylinder which revolves in contact with a flat traveling bed, the latter carrying or itself constituting a die, while the cylinder acts as a counter-die. It may be produced by the contact of two revolving cylinders acting, respectively, as die and counter-die. By another method both the printing and embossing are done at one operation, the die being inked either by hand or by some mechanical device; but in practically all machines used to effect this double result, both the printing and embossing are produced by direct flat pressure, such as is employed in any platen-press.

By my improved machine both printing and embossing are accomplished simultaneously and at a single operation as a result of the pressure exerted between the convex surfaces of two cylindrical rollers rotating one above the other and in opposite directions. To the surface of the upper cylindrical roller is adjusted a die, which is curved to conform to this surface, from which it may be removed and upon which it may be replaced by other similarly-curved dies. The counter-die for the purpose of accurate adjustment or "register," as is hereinafter described, is preferably supported upon a flexible sheet of thin metal. This sheet of metal may be curved to conform to the surface of the lower cylindrical roller of which it then forms a part or it may be carried in a horizontal position across and above the lower cylinder. In either case contact between the die and the counter-die is produced by the pressure exerted between the surfaces of the two rotating cylindrical rollers. In either case also the counter-die may be removed and replaced by such other counter-dies as may be required by the change of dies upon the upper cylindrical roller. In order to allow the operator opportunity between two successive contacts of the die and counter-die to feed the paper or other material to be thus printed and embossed and to remove the same when the result has been accomplished, the surface to which the die is attached constitutes only a portion of the complete periphery of a cylinder. The segment thus employed measures about one-third of the whole circumference. Two-thirds of the time required for a complete rotation are thus allowed for feeding and removing the paper or other material which is to be printed and embossed.

In combination with the die, the counter-die, and the cylindrical rollers above described I use an inking-roller and fountain, mechanisms for cleaning and polishing the die, and other devices necessary for the operations of printing and embossing, which are shown in the drawings and described in the following specification.

Figure 2:
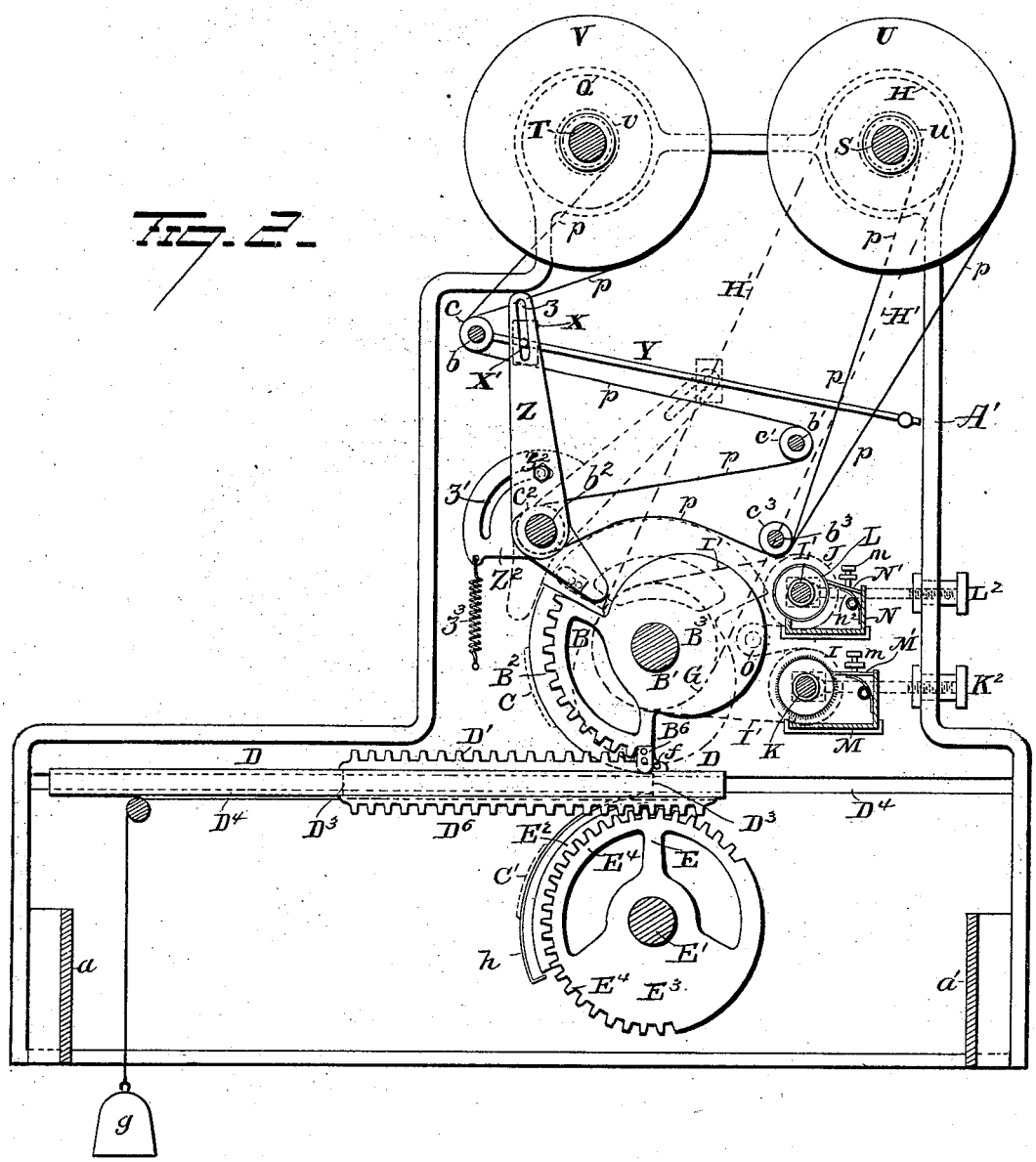
Figure 3:
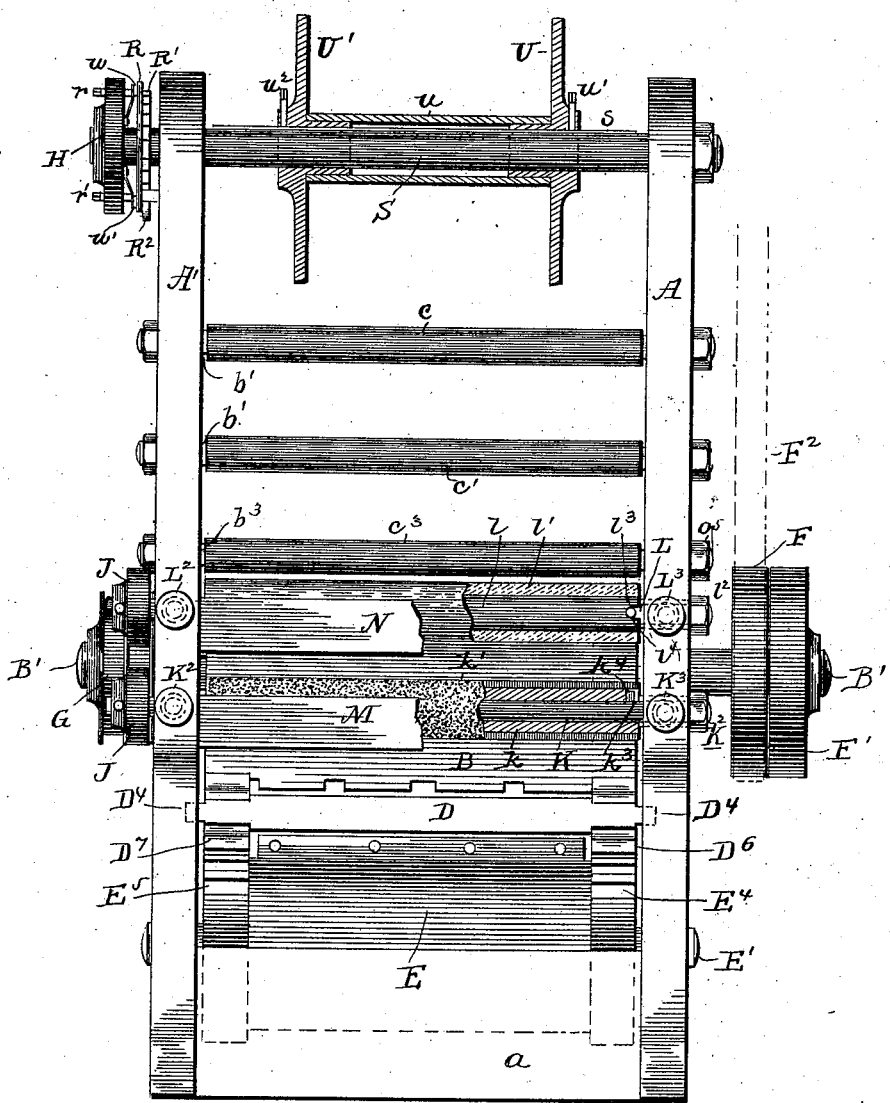
Figure 4:
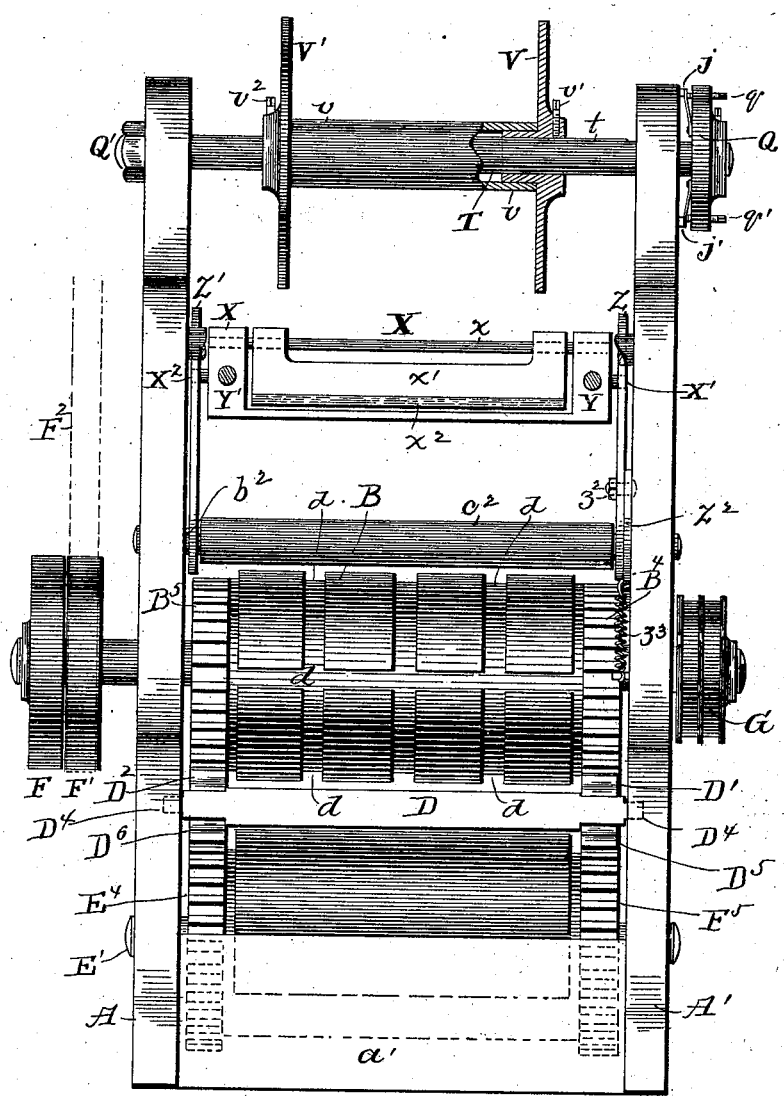

In the accompanying drawings, Figure 1 is a view in side elevation of the machine. Fig. 2 is a similar view with the side plate of the frame removed. Fig. 3 is an end view. Fig. 4 is a view of the opposite end. Fig. 5 is a plan view. Figs. 6, 7, 8, 9, 10, 11, 12, 13, 14, 15, and 16 are details; and Fig. 17 is an elevation of a portion of the machine, illustrating a modification.

The frame A, which is the counterpart of the opposite side A', is made of cast-iron and in form and shape substantially as here shown. These sides are cast with bosses and lugs, which are used in the construction of the journal-boxes or as supports for the various working parts of the machine. The sides are connected by the braces $a$ and $a'$, (see Figs. 2 and 5,) by the rods $b$, $b'$, and $b^3$, which pass through the sides of the frame and are secured by the nuts $o, o', o^2, o^3, o^4, o^5$, and $o^6$ (see Figs. 2 and 3) and by the different operating-shafts of the machine. The frame is bolted to a table or bench of suitable height for the proper operation of the machine, or the lower part of the castings may be sufficiently extended to raise the machine the required distance above the floor.

The upper segmental cylinder-roller B is constructed as shown. The segment $B^2$ has a superficial area equal to about one-third of the complete area of a cylinder of the same diameter. On the side of the shaft B' opposite to the segment $B^2$ is placed a counterbalance $B^3$. The surface of the segment $B^2$ is provided with dovetailed slots $d$, Figs. 6, 7, and 8, which are designed to hold the cleats $e$, Figs. 9 and 10, by which the die C is fastened to the segment $B^2$.

I do not wish to limit myself to any particular arrangement of the dovetailed slots nor to a particular form of cleat, as both may be varied to suit the requirements of different kinds of work.

The die C, as hereinbefore stated, is separate and removable and may be replaced upon the segmental cylinder-roller by other dies. It is constructed of brass, steel, or other suitable material and is curved to conform to the surface of the segment $B^2$. On either end of the segment $B^2$ is a gear-segment $B^4$ and $B^5$, the teeth of which engage with those of racks D' and $D^2$, Figs. 2 and 5. These racks are attached to the upper longitudinal margins of the movable table D. In order that the teeth of the segmental roller B and those of the racks D' and $D^2$ may engage properly, a search-tooth $B^6$ is attached to one end of the gear-segment $B^4$. This coming in contact with the pin $f$ causes the teeth to engage and the table D to move.

The table D is provided with a rectangular aperture $D^3$, Fig. 5, corresponding in length and width to the dimensions of the segment $B^2$. The table moves forward and backward in the ways $D^4$ $D^5$. Motion is at first imparted by the gearing of the racks with the teeth of the upper segmental roller, as above described. The return motion is effected by weights $g$ and $g'$ or some equivalent.

In the construction shown in Fig. 2 the form of the lower cylindrical roller E is similar to that of the upper roller B. The counterbalance $E^3$ is so placed as to assist the weights $g$ and $g'$ in causing the table to return to the position shown in Fig. 2. The gearing $E^4$ and $E^5$ (see Fig. 16) at the ends of the cylinder form in each case a nearly-complete spur-wheel, so that the teeth may be always engaged with those of the racks $D^6$ and $D^7$, which are attached to the longitudinal margins of the table D on its lower side. Conforming to and completely covering the surface of the segment $E^2$ is a sheet of thin steel, brass, or other suitable metal $h$. This sheet is secured to the segment $E^2$ along its transverse edge $E^6$, but is not otherwise fastened. Upon this thin metal sheet the counter-die C' is placed. The counter-die is composed of any suitable substance capable of producing or receiving a "reverse" or "counter" of the die C and is attached to the sheet $h$ by the adhesion of its own substance or by any suitable cement. In adjusting the counter-die C' and in determining the distance to which it shall extend above the metal sheet $h$ a piece of paper or other material of the same thickness as that to be printed and embossed is placed between the surface of the lower segment $E^2$ and the metal sheet $h$ and below the counter-die C'. When proper contact is thus secured between the die C and the counter-die C', the removal of the paper which was placed below the metal sheet will allow the requisite space between the die C and counter-die C' for the paper or other material which is to be printed and embossed. If for any reason proper contact is not secured, the operator prepares an "underlay" upon the surface of the lower segment $E^2$, and thus secures the requisite amount of "impression."

When the construction shown in Fig. 17 is employed, the lower roller is a complete cylinder. Two sheets of metal $h'$ and $h^2$ are secured to the forward end of the table D, but are not otherwise fastened to it. These sheets extend backward under the table throughout its entire length and rest upon the lower cylinder $E^6$. On the upper of these metal sheets $h'$ and within the aperture $D^3$ of the table is placed a metal block $D^8$, which is attached to the upper flexible sheet $h'$ by bolts or screws $i^2$ $i^3$. Upon this block the counter-die $C^2$ is fastened by cement or other suitable means. In adjusting the counter-die $C^2$ for proper contact with the die C paper or an underlay is placed between the upper and the lower flexible sheets, substantially as described for similar adjustment in the previous construction. As the lower cylinder rotates by contact with the lower metal sheet $h^2$ no teeth are used at the ends of the cylinder, and the racks $D^6$ and $D^7$ on the table D become unnecessary. The shaft B' is the main driving-shaft and is operated by the belt $F^2$, which passes around the fast and loose pulleys F and F'. On the opposite end of this shaft is a double pulley G. From the outer part of this pulley a belt H' passes to the pulley H for operating a web or ribbon of paper used in polishing the die C. From the inner part of the same pulley G a belt I' passes to the pulleys I and J, which operate the ink-roller K and the wiping-roller J.

The shaft of the ink-roller K (see Fig. 3) passes through a wooden sleeve or core $k$, which is covered with soft bristles or with a fabric of pile—such, for example, as plush $k'$. The ink-fountain M, Figs. 2, 13, and 14, is provided with an adjustable cover M', which acts as a "doctor" or scraper to remove any surplus of ink. This cover is adjusted by the set-screws $m$ and $m'$, which force it down against springs, one of which, $m^2$, is shown in Figs. 2 and 14. Proper contact of the ink-roller K with the surface of the die C is secured and controlled by moving the journal-boxes K' by means of the draw-bolts $K^2$ and $K^3$. The wooden sleeve or core $k$ of the ink-roller slides easily over the shaft K and has a slot $k^4$, which locks with the pin $k^3$, causing the core $k$ to revolve with the shaft K. The end of the shaft K opposite to that upon which the pulley I is fixed passes through the side of the frame A'. Upon this end of the shaft K a thread is cut, and the shaft is held in position by a nut $k^2$. This nut has a sleeve which passes through side of the frame A' and rests against the end of the core $k$. By removing the nut $k^2$ the shaft K may be easily withdrawn through the side of the frame A whenever it is desirable to clean or re-cover the ink-roller.

The wiping-roller L is covered with any elastic composition suitable for removing the ink from the face of the die C. It is mounted in a box N, similar to the ink-fountain M, and is provided with an adjustable cover N'. This cover acts as a scraper and removes the strippings, which are caught in the box N. The cover N' is adjusted, like the cover of the ink-fountain M', by means of the set-screws $n$ and $n'$ and springs $n^2$. The elastic composition $e'$ of the roller is formed upon a core $e$, which is a piece of metal tubing sliding easily over the shaft L' and having a slot $l^4$, which locks with the pin $l^3$, causing the sleeve $l$ to revolve with the shaft L'. The end of the shaft L' which passes through the side of the frame A' is secured by the nut $l^2$, which is like the nut $k^2$ on the ink-roller. The wiping-roller may be easily withdrawn by the removal of this nut $l^2$. It will be observed that the shafts K and L' pass through sleeves mounted in the frame, and by the removal of the sleeves the shafts can be removed, notwithstanding the pins $k^3$ and $l^3$. When the sleeves are removed and the shafts drop to the bottom of the holes in the frame formerly occupied by the sleeves, the shafts, with the pins projecting therefrom, can be readily removed. Proper contact of the wiping-roller with the die C is secured by means of the draw-bolts $L^2$ and $L^3$. The belt I', which passes around the pulleys I and J of the ink-roller and the wiping-roller, by passing also around the idle pulley O causes both the ink-roller K and the wiping-roller J to turn in the same direction.

The pulley H on the shaft S is a loose pulley. The disk R is keyed to the shaft S. Through the pulley H pass the set-screws $r$ and $r'$, which are in contact with the springs $w$ and $w'$, Figs. 3 and 12. By proper adjustment of these springs sufficient friction is produced between the pulley H and the disk R to cause the shaft S to turn when the strain exerted by the polishing-paper $p$, Fig. 2, is removed. On the inner side of the disk R is a ratchet R'. When this ratchet turns in the same direction as that of the loose pulley H, its teeth slide over the pawl $R^2$, which immediately arrests any tendency of the ratchet R' or of the shaft S to turn in the opposite direction.

The flanges U and U', together with the core $u$, constitute one of the two rolls upon which the polishing-paper $p$ is wound. These flanges U and U' are movable longitudinally upon the shaft S. They may, however, be securely attached to the shaft S and may be made to revolve with it by means of the set-screws $u'$ and $u^2$, which pass down into the spline $s$. The core $u$, upon which the polishing-paper $p$ is wound, is a piece of metal tubing, and as paper of different widths may be required for dies which are liable to vary in size the paper-roll is made adjustable by providing cores of suitable lengths, which are secured between the flanges U and U'. The shaft S is secured at the end opposite the pulley H by the nut P. By removing this nut the shaft may be quickly withdrawn and replaced in making adjustments of the paper-roll.

The shaft T is constructed, like the shaft S, with a spline $t$, in which by means of the set-screws $v'$ and $v^2$ the flanges V and V' may be securely fastened to the shaft T. The shaft T is secured at the end opposite the disk Q by the nut Q'. By removing this nut the shaft may be readily withdrawn. On the end of this shaft T which passes through the side of the frame A is a disk Q, provided with the springs $j$ and $j'$ and the set-screws $q$ and $q'$. By the adjustment of these springs sufficient friction is produced between the disk Q and the side of the frame A to prevent any rotation of the shaft T except when the polishing-paper is being unwound from the roll formed by the flanges V and V' and the core $v$. This adjustable roll is the counterpart of that used on the shaft S. Upon the core $v$ is wound a web or ribbon of paper $p$, which is first carried over the revolving sleeve $c$ on the rod $d$. It then passes through the movable head X, around the sleeves $c'$, $c^2$, and $c^3$, which surround the rod $b'$, the shaft $b^2$, and the rod $b^3$. From the sleeve $c^3$ the paper $p$ is carried to the roll on the shaft S, upon which it is rewound. Between $c^2$ and $c^3$ it comes in contact with the die C as it revolves upon the segment $B^2$. The movable head X (see Figs. 4 and 12) has at the top a rod $x$, upon which is suspended a hanger $x'$. The lower edge $x^2$ of this hanger is tipped with rubber. Through the holes $y$ and $y'$ pass the guides Y and Y', upon which the head X slides. The connecting-pins X' and $X^2$ pass through slots $z$, Fig. 2, in the lever-arms Z and Z'. These arms are fastened by keys to the shaft $b^2$. On this shaft $b^2$ is also an adjustable extension $Z^2$ to the lever-arm Z. By means of the slot $z'$ and the bolt $z^2$, Fig. 2, this adjustable extension $Z^2$ may be securely attached to the lever-arm Z. The position in which the arm Z and the extension $Z^2$ are united along the slot $z'$ determines the angle at which the lower part of the adjustable extension $Z^2$ projects downward. This lower projection is so placed that it comes in contact with the search-tooth $B^6$ during the revolution of the cylindrical roller B. The search-tooth $B^6$ (see dotted lines, Fig. 2) pushes forward the lever-arm extension $Z^2$, causing a corresponding movement of the arm Z. The amount of this throw depends upon the adjustment of the arm Z and its extension $Z^2$. As the arms Z and Z' move they carry with them the movable head X along the guides Y and Y'. The hanger $x'$ is so suspended that when the arms move from $c$ toward $c'$ the paper $p$ is grasped between the rubber edge of the hanger $x^2$ and the bottom of the head X and is carried a distance equal to the throw of the arm Z. When the extension $Z^2$ is released from contact with the search-tooth $B^6$, it returns to the position it occupied before contact by means of the force exerted by the spring $z^3$. As the arms Z and Z' and the head X are thus carried back to their original position the hanger $x'$ releases its hold on the paper $p$ and slides over it.

The operations are as follows: The curved embossing-die C is fixed upon the surface of the segment $B^2$ of the upper segmental cylinder-roller B. By means of this die C a counter-die C' or $C^2$ is formed in any proper material which is placed upon a flexible metal sheet $h$ or $h'$ in contact with the lower cylindrical roller E or $E^6$. Motion and power are communicated by the belt $F^2$. As the die C passes the ink-roller K ink is supplied to the die C, and as it passes the wiping-roller L surplus ink is removed from the face of the die. As the die C is passing under the web or ribbon of polishing-paper $p$ the arm $z$ is set in motion by the search-tooth $B^6$. Paper is drawn from the roll on the shaft T and wound on the roll on the shaft S. This paper polishes the die C and insures perfect cleanliness before it reaches the paper or other material to be embossed and printed. The length of polishing-paper moved at each revolution of the cylindrical roller B should be proportionate to the width of the die C and is regulated, as already explained, by the adjustment of the arm Z and its extension $Z^2$. When one side of the paper web has been used for polishing, the reverse or clean side of the paper may be utilized by removing the roll of paper on its core $u$ from shaft S, by sliding it on the shaft T in place of the core $v$, and by connecting the end of the paper properly with a core on the shaft S. The paper or other material to be embossed and printed is placed upon the table D at the left in Figs. 1, 2, or 17 and is fed over the opening $D^3$, which, with the exception of a sufficient aperture for the die C, may be covered with paper, cardboard, or thin metal, upon which the operator arranges his guides for feeding. As the die C and the counter-die C' or $C^2$ meet the paper or other material is caught between them. When they have passed each other, the process of embossing and printing is completed, and as the table D returns to the position from which it started the paper or other material thus embossed and printed is removed by the operator.

Without limiting myself to the precise construction or arrangement of details in the parts shown and described, I claim and desire to cover by Letters Patent—

1. In an embossing and printing machine, the combination with a die, of two rollers, a polishing-strip wound on said rollers and adapted to bear between its ends on said die, means for moving said die in one direction, and means for intermittingly moving the polishing-strip and means for automatically rotating one of said rollers to cause the polishing-strip to be wound thereon, substantially as set forth.

2. In a rotary embossing and printing machine, the combination with two segmental rotary carriers, a convex segmental die removably secured to one of said segmental carriers, and a removable counter-die carried by the other segmental carrier, of an inking-roller, an elastic inking-roller for said die, a polishing-paper means for moving over and in contact with said convex die, rollers on which said polishing-paper is wound, and means for automatically rotating one of said rollers, substantially as set forth.

3. In an embossing and printing machine, the combination with the embossing and printing die, of a polishing-strip, and vibratory means for drawing a limited and predetermined quantity thereof across the said die, and an automatic take-up for keeping the strip taut.

4. In an embossing-machine, the combination with a die-carrier and a die, of a polishing-strip and means operated automatically by the die-carrier for drawing a limited and predetermined quantity of said polishing-strip across the die.

5. The combination with a revoluble die-carrier and a die, of a polishing-paper strip, means for causing said strip to make contact with and move across the die, a gripping device, devices intermediate of the die-carrier and gripping device for operating the latter to draw a predetermined amount of polishing-paper across the die, and means for adjusting said intermediate devices for regulating the amount of strip to be drawn across the die at each operation of said intermediate devices, substantially as set forth.

In testimony whereof I have signed this specification in the presence of two subscribing witnesses.

CHARLES E. MAAS.

Witnesses:
GEORGE W. SELTZER,
M. RECEVEUR.